(12) United States Patent
Ng et al.

(10) Patent No.: US 10,678,910 B2
(45) Date of Patent: Jun. 9, 2020

(54) MODIFYING WEB PAGE CODE TO INCLUDE CODE TO PROTECT OUTPUT

(71) Applicant: ENTIT Software LLC, Sunnyvale, CA (US)

(72) Inventors: Ming Sum Sam Ng, Hong Kong (CN); Alvaro Munoz, Las Rozas (ES); Oleksandr Mirosh, Kyiv Oblast (UA)

(73) Assignee: Micro Focus LLC, Santa Clara, CA (US)

( * ) Notice: Subject to any disclaimer, the term of this patent is extended or adjusted under 35 U.S.C. 154(b) by 67 days.

(21) Appl. No.: 15/559,642

(22) PCT Filed: Apr. 10, 2015

(86) PCT No.: PCT/US2015/025277
§ 371 (c)(1),
(2) Date: Sep. 19, 2017

(87) PCT Pub. No.: WO2016/164036
PCT Pub. Date: Oct. 13, 2016

(65) Prior Publication Data
US 2018/0336348 A1    Nov. 22, 2018

(51) Int. Cl.
*G06F 21/54* (2013.01)
*G06F 21/52* (2013.01)
*H04L 29/06* (2006.01)
*H04L 29/08* (2006.01)
*G06F 8/41* (2018.01)

(52) U.S. Cl.
CPC .............. *G06F 21/54* (2013.01); *G06F 21/52* (2013.01); *H04L 63/1466* (2013.01); *H04L 63/1483* (2013.01); *G06F 8/41* (2013.01); *G06F 2221/032* (2013.01); *G06F 2221/033* (2013.01); *H04L 67/02* (2013.01); *H04L 67/2804* (2013.01); *H04L 67/2895* (2013.01)

(58) Field of Classification Search
CPC ..... G06F 21/54; G06F 21/05; H04L 63/1466; H04L 63/1483
See application file for complete search history.

(56) References Cited

U.S. PATENT DOCUMENTS

| 7,451,352 | B1 | 11/2008 | Moore et al. |
| 7,484,205 | B2 * | 1/2009 | Venkatapathy ..... G06F 11/3624 717/158 |
| 8,601,580 | B2 | 12/2013 | Hansen et al. |
| 9,015,844 | B1 * | 4/2015 | Franklin ............... G06F 21/577 713/165 |

(Continued)

FOREIGN PATENT DOCUMENTS

WO      2011154454      12/2011

OTHER PUBLICATIONS

Barua et al., "Protecting Web Browser Extensions from JavaScript Injection Attacks," 2013 18th International Conference on Engineering of Complex Computer Systems Year: 2013 | Conference Paper | Publisher: IEEE.*

(Continued)

*Primary Examiner* — Roderick Tolentino
(74) *Attorney, Agent, or Firm* — Trop, Pruner & Hu, P.C.

(57) ABSTRACT

Examples disclosed herein relate to modifying a web page. In one example, in response to beginning execution of a process initiating generation of a web page of a web application at a server, a runtime agent is executed. In this example, the runtime agent modifies code of the web page to inject code to protect output of the web page. In the example, the process can be executed using the modified code to generate a modified web page.

20 Claims, 6 Drawing Sheets

(56) References Cited

U.S. PATENT DOCUMENTS

| | | | | |
|---|---|---|---|---|
| 9,043,750 | B2* | 5/2015 | Hoffmann | G06F 8/24 717/106 |
| 9,122,842 | B2* | 9/2015 | Shin | G06F 21/00 |
| 2006/0212932 | A1* | 9/2006 | Patrick | H04L 63/1441 726/11 |
| 2006/0259973 | A1 | 11/2006 | Sima et al. | |
| 2007/0016949 | A1* | 1/2007 | Dunagan | G06F 21/51 726/22 |
| 2011/0197180 | A1 | 8/2011 | Huang et al. | |
| 2012/0023394 | A1 | 1/2012 | Pieczul et al. | |
| 2013/0097663 | A1* | 4/2013 | Finger | G06F 21/51 726/1 |
| 2014/0359773 | A1* | 12/2014 | Matthews | G06F 21/52 726/24 |
| 2014/0373087 | A1 | 12/2014 | Ciu et al. | |
| 2015/0058824 | A1* | 2/2015 | Smiljanic | G06F 11/3636 717/125 |
| 2017/0220798 | A1* | 8/2017 | Madou | G06F 21/552 |

OTHER PUBLICATIONS

Khan et al., "Towards vulnerability prevention model for web browser using interceptor approach," 2015 9th International Conference on IT in Asia (CITA) Year: 2015 | Conference Paper | Publisher: IEEE.*

Content Security Policy, (Web Page), Nov. 3, 2014. < https://w3c.github.io/webappsec/specs/content-security-policy/ >.

Content Security Policy, What It Is, What It Does, and How to Implement It, (Web Page), Dec. 11, 2013.

Content Security Policy: a Primer, (Web Page). <https://mikewest.org/2011/10/content-security-policy-a-primer>.

Introducing Content Security Policy, (Web Page). <https://developer.mozilla.org/en-US/docs/Web/Security/CSP/Introducing_Content_Security_Policy>.

W. Mike, An Introduction to Content Security Policy, (Web Page), Jun. 15, 2012. <http://www.html5rocks.com/en/tutorials/security/content-security-policy/>.

International Search Report and Written Opinion dated Jan. 7, 2016 for PCT Application No. PCT/US2015/025277 Filed Apr. 10, 2015, 14 pages.

EP Extended Search Report; 15888682.0-1218 I 3281143 PCT/US2015025277; dated Oct. 23, 2018; 9 pages.

Weinberger Joel et al: "A Systematic Analysis of XSS Sanitization in Web Application Frameworks", Sep. 12, 2011 (Sep. 12, 2011), Medical Image Computing and Computer-Assisted Intervention—MICCAI 2015: 18th International Conference, Munich, Germany, Oct. 5-9, 2015; Proceedings; [Lecture Notes in Computer Science; Lect.Notes Computer], Springer International Publishing, CH, XP047433978, ISSN: 0302-9743, ISBN: 978-3-319-24946-9 *the whole doucment*.

* cited by examiner

*700*

```
<html>
<head>
<script>   /―701a
var x = "hello world";
doAction1(x);  ―703a
</script>   ―701b
<script>
var y = '<%=name%>';
doAction1(y);   ―703b
</script>
</head>
<body>
<h1><%=name%></h1>
<form onsubmit="doAction2(<%=data%>)">   ―705
Name: <input name="name" value="<%=name%>">
<input type="submit" name="submit">
707 ―  </form>
</body>
</body>
```

*FIG. 7*

```
<%
  response.addHeader("Content-Security-Policy",
         "script-src 'sha256-xxxxx' 'nonce-yyyy'");
%>
<html>
<head>
<script>
var x = "hello world";
doAction1(x);
</script>
<script nonce="yyyy">
var y = '<%=Library.checkJsString(name)%>';
doAction1(y);
</script>
</head>
<body>
<h1><%=Library.checkNoTag(name)%></h1>
<form id="form123" onsubmit="...">
<script nonce="yyyy">
document.getElementById("form123").onsubmit = function() {
  doAction2('<%=Library.checkNoQuote(data)%>')
}
</script>
Name: <input name="name" value="<%=Library.checkNoQuote(name)%>">
<input type="submit" name="submit">
</form>
</body>
```

*FIG. 8*

MODIFYING WEB PAGE CODE TO INCLUDE CODE TO PROTECT OUTPUT

BACKGROUND

Web applications are implemented by a combination of hardware and software and run in a web browser. Applications are a popular target for attackers. Applications can have vulnerabilities susceptible to attacks. Examples of attacks on applications include cross-site scripting. Cross-site scripting enables attackers to inject a client-side script into web pages viewed by others.

BRIEF DESCRIPTION OF THE DRAWINGS

The following detailed description references the drawings, wherein:

FIG. 7 is a diagram of an unmodified section of code that includes output at a web page, according to an example; and FIG. 8 is a diagram of a modified section of code that includes output at a web page, according to an example.

DETAILED DESCRIPTION

Figure 1:
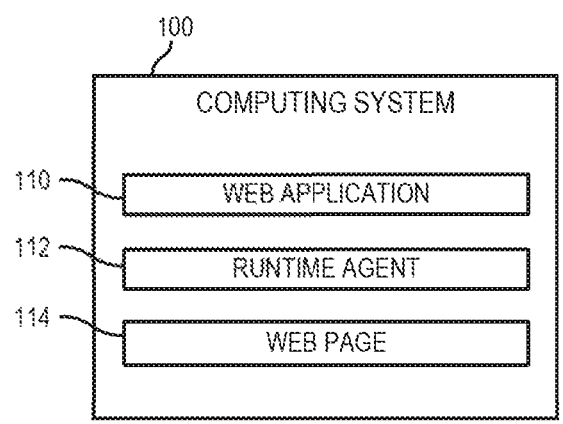
FIG. 1 is a block diagram of a computing system capable of modifying code of a web application to generate a modified web page, according to an example.

Web applications are implemented by a combination of hardware and software. Web applications may be run in web browsers. Access is provided by web application servers. Web applications have become popular due to the popularity of web browsers, which can be used as clients for the applications. However, web applications are the target of various attacks.

As the number and complexity of enterprise web applications grows, the attack surface for exploits increases, leaving enterprises exposed. Traditional methods of protecting web applications can take significant time to implement and may be focused on the development stage of software. These methods often do not protect web applications running in production. Additionally, with a majority of successful breaches occurring at the application layer, installing simple perimeter defense to protect production software may lack effectiveness.

Attacks that allow a client to modify a web page accessed by another client, such as cross-site scripting (XSS), are common web application vulnerabilities. XSS allows an attacker to inject HyperText Markup Language (HTML) scripts such as JavaScript and VBScript into web pages viewed by other users. In some examples, the injected script can by-pass access control, steal user credentials, execute arbitrary harmful scripts under the user's security context, and the like.

One approach to protect against XSS is input validation. However, it is challenging to maintain accurate whitelists for all parameters. Further, basing input validation on blacklisting is susceptible to false negatives.

Accordingly, approaches disclosed herein help protect against web page output attacks such as XSS by adding code to protect a web application. A runtime agent acts upon the web application by including code at certain points of the web application to call the runtime agent to execute. Processes to generate web pages are intercepted when a web page to be served is generated. The runtime agent determines a context associated with output of the web pages and determines code to inject to protect the output, where the source code is associated with the context. As used herein, context is the setting in which the output is used. The context can be determined by an identifier as noted below. The code to inject to protect the output is added to the source code before generating the web page. According to examples described herein, the source code includes information used to generate a web page. The source code can include content and/or references to content.

As described herein, a runtime agent is a combination of programming and hardware to watch the internal operations performed by the web application during execution of the web application. The runtime agent can be called when particular Application Programming Interfaces (APIs) are called (e.g., where the particular APIs include the code to call the runtime agent). As used herein, an API specifies a set of functions or routines that accomplish a specific task. The runtime agent can be called when a process to generate the web page is initiated and can modify the web page to include additional code injected to protect output of the respective web pages before the web page is generated.

In some examples, the code injected to protect the output relates to context sensitive validation, such as Context Sensitive Encoding (CSE). The context sensitive validation can be based on a data structure, such as a table indicating a context sensitive validation to implement based on an identifier in the source code or multiple identifiers. A set of possible identifiers for identifying context in a web page can be stored in a data structure associated with the runtime agent. The identifiers can include identifiers that open a context (e.g., <script>, <form>, etc.) and identifiers that close a context (e.g., </script>, </form>, etc.). The identifiers in the data structure can be compared to the source code to identify the associated context. A context is the setting that output of a webpage is in. Context can be considered as the information of any particular location inside the HTML document. For example, if the location is a HTML node element, then the relevant information can be all parent/child/sibling nodes; or if the location is inside a HTML attribute, then the relevant information can be the node name, other node attributes and child nodes; or if the location is inside a script tag, then the relevant information can be whether it is a quoted text or not. For example, if a first identifier <html> followed by a second identifier <body> precedes the output and the output is followed by </body> and </html>, the context of the output is HTML text. In this case, the content between <body> and </body> is the output. In one example, an identifier, when processed or parsed, can identify the beginning of a context. In some examples, an identifier may include one character or multiple characters. In this example, another identifier can identify the end of the context. Examples of contexts include HTML Text, HTML Attribute, HTML Comment, HTML Attribute: URL, JavaScript Text, JavaScript String, etc. An HTML parser and/or regular expressions can be used to determine the context based on identifiers in the code. The context is the setting that the output is within. As noted, the setting is identified using the identifiers, for example, the context can be identified by usage of anchor tags, or other syntax.

In other examples, the code injected to protect the output can help enforce a security policy implemented at an end user's web browser. For example, certain web browsers may implement a security policy, such as Content Security Policy (CSP). The security policy can be standardized, such as in CSP, or otherwise implemented. The security policy can be implemented in two parts, a web application that is compliant with the policy and a browser that implements the policy. A web application is compliant with the policy if it provides information that can be used by the browser to protect the output content of the web application according to the policy. The browser can implement the security policy based on the information that a compliant web application provides. In an example using CSP, the web application can provide a standard Hypertext Transfer Protocol (HTTP) header that declares approved sources of content that the browser should be allowed to load on a web page. The approved sources of content can be implemented, for example, using a whitelist of content that is from approved sources. The browser can implement the policy based on this information. Examples of types of content include JavaScript, Cascading Style Sheets (CSS), HTML, frames, fonts, images, embeddable objects such as applet, audio files, video files, etc. In one example, the runtime agent can add security policy headers to the web application source code when a page is being generated during execution of the web application. As such, the policy can be implemented without need for modifying and recompiling the whole web application.

Figure 2:
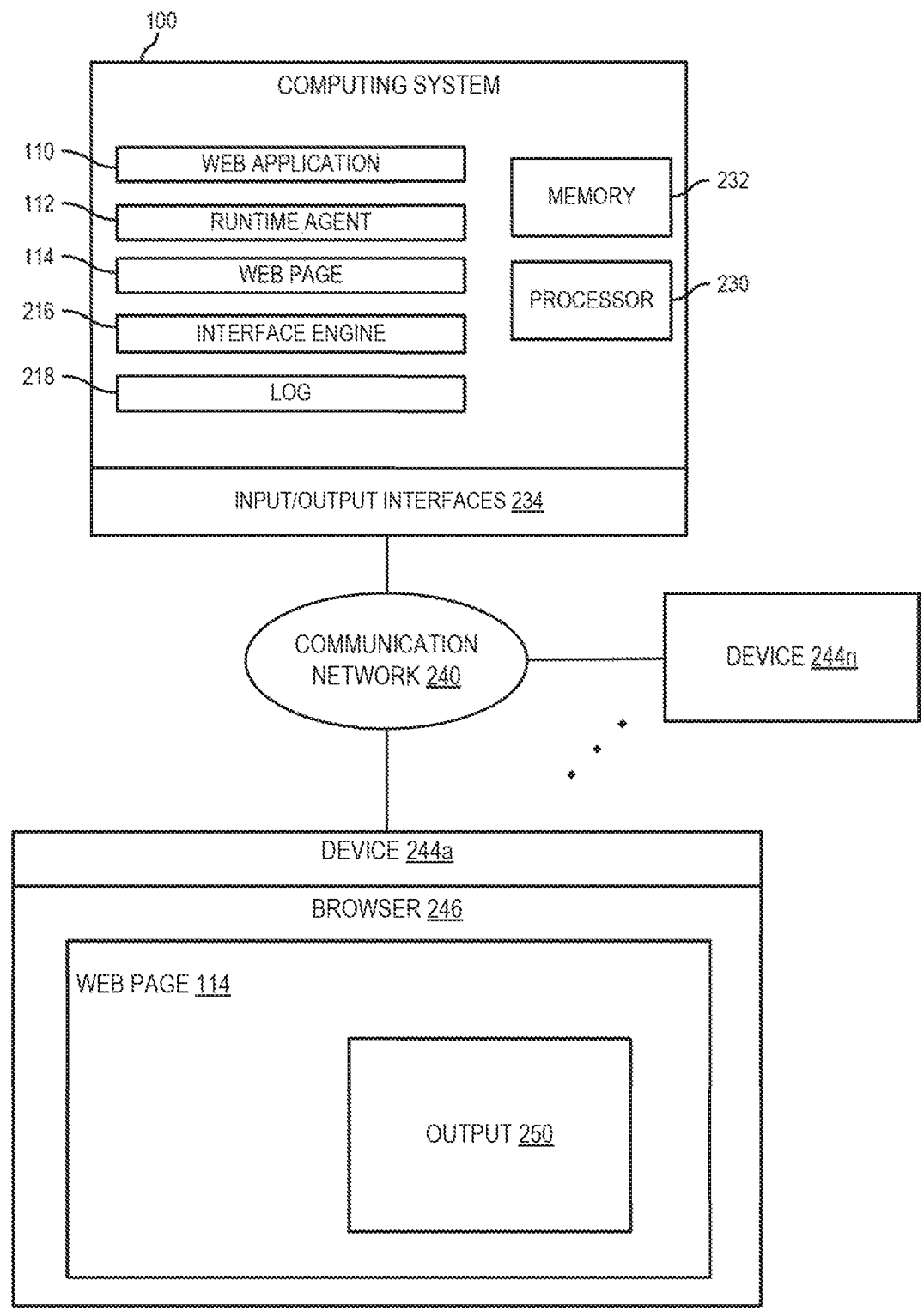
FIG. 2 is a block diagram of a system including a computing system capable of modifying code of a web application to generate a modified web page, according to an example.

FIG. 1 is a block diagram of a computing system capable of modifying code of a web application to generate a modified web page, according to an example. FIG. 2 is a block diagram of a system including a computing system capable of modifying source code of a web application to generate a modified web page, according to an example.

In one example, computing system 100 can include a web application 110, a runtime agent 112, and a web page 114. In another example, the computing system can be part of system 200 and further include an interface engine 216, a log 218, processor 230, memory 232, input/output interfaces 234, etc. In some examples, system 200 can further include a communication network 240 that allows the computing system 100 to serve the web application 110 to devices 244a-244n. The computing system 100 can include a physical processor(s) implementing machine readable instructions to cause the computing system 100 to perform certain functionality.

When serving the web application 110, the computing system 100 can provide an interface, via the interface engine 216 and input/output interfaces 234 to allow the devices 244 to access the web application 110. Input/output interfaces 234 can include network interface cards, a keyboard interface, a mouse interface, other components to interact with the computing system 100, etc. A browser 246 on the device 244 can be used to access web pages 114 of the web application 110. In certain examples, a web page 114 provides content of the web application 110 to the browser 246. The browser 246 can be used to cause display of the web page 114 including output 250.

As noted, the web application 110 can be executed by a device 244 in a browser 246. The web application 110 can be created in a browser-supported programming language such as JAVASCRIPT, HyperText Markup Language (HTML), Cascading Style Sheets (CSS), etc. Further, a web application framework (e.g., .NET, JavaEE, Apache Velocity, etc.) can be used to implement the web application 110. Examples of web applications 110 include email applications, maps and navigation applications, banking sites, trading sites, news sites, forums, etc. The web application 110 can have access to a database or multiple databases (not shown).

As noted, the web application 110 may be encoded in any suitable Web-based computer language, such as JAVA, or .NET, among others. The web application 110 may operate within a suitable software framework, such as Struts, Struts 2, ASP.NET MVC, Oracle WebLogic, and Spring MVC, or the like. The software framework includes a set of common code modules that provide generic functionality, which can be selectively overridden or specialized by user code to providing specific functionality. The web application 110 may be configured to execute one instance or multiple instances of a Java Virtual Machine (JVM), Common Language Runtime (CLR), or other runtime environment.

The runtime agent 112 can operate within the execution environment of the web application 110 and has access to the internal operations performed by the web application 110. For example, the runtime agent 112, in certain examples, may modify the bytecode of the web application 110 by injecting additional code, such as a JAVA class, at various program points. The modified bytecode can be used to call the runtime agent to perform a method. One method that can be called is a method to record and manage security events, such as failed context sensitive validation or CSP violation. A second method that can be called is a method to modify web page code. The methods that can be called are not limited to the examples described herein.

The injected code may be added at strategic program points in the web application 110, for example, at application programming interface (API) calls that perform specific operations, such as generating a web page 114. In one example, a strategic program point is at the start of a particular API that is part of the process in the application framework of the web application 110 responsible for generating a web page from source code. In another example, a strategic program point is at the end of a particular API, before calling of another API or function, etc. The APIs can be determined by a programmer and inserted into the runtime agent. With this approach a programmer need not look at the code of the web application to determine the program point, instead, the program point is associated with the API. The runtime agent can insert the program points for APIs to call particular methods of the runtime agent.

A browser 246 can request a web page 114 from the web application 110. In response to the request, source code for the requested web page 114 can be gathered to provide to the browser 246. A process to generate the web page 114 can be called by the web application 110.

In various examples, the runtime agent 112 is initiated in response to a strategic program point of the web application 110 being called or executed. The process for generation of the web page 114 that includes the program point can be dependent on the type of programming language implemented.

In certain examples, the process for generation of the web page can be a compile process or part of the compile process to generate the web page 114 from source code. The compile process may include one API and/or multiple APIs. Tomcat Java Server Page (JSP) is a technology to dynamicaly generate web pages based on HTML, XML, or other document types. In the example of Tomcat JSP, the compile process may include the API org.apache.jasper.compiler.JSPUtil.getReader( ), which may be called to read a JSP source file and then pass the file stream reader to the JSP compiler. In this example, the runtime agent 112 can be implemented in response to the web application 110 calling JSPUtil.getReader( ) and the runtime agent 112 can modify the data stream received via the JSPUtil.getReader( ) to include injected code (e.g., context sensitive validation, a security policy header to invoke a browser policy response, etc.) to protect output. As such, when the JSP compiler is working, the JSP compiler can see the data stream modified by the runtime agent 112. In certain examples, the API that indicates that a web page 114 is going to be generated (in this example compiled) includes the strategic program point to call the runtime agent 112 because the runtime agent 112 previously injected code into the API and the data can be modified before the process that generates the web page 114 performs. In some examples, the process to generate the web page may include access to the source code for the web page 114. The API indicative that the web page 114 is going to be generated can be determined by a programmer based on the framework used to implement the web application 110. The example shown is for the Tomcat JSP compiler, however, readers that have access to the web page code can be used.

The runtime agent 112 modifies the source code of the web page to inject code to protect output of the web page. As mentioned above, in certain examples, the injected code to protect output may comprise a context sensitive validation. In other examples, the injected code can include adding information to guide a browser 246 implementing a security policy. Further, in some examples, the injected code may include both context sensitive validation and security policy information as protections. Responsive to the web page being modified with the injected code and the runtime agent 112 completing execution of its method, execution is returned to the web application 110 and the web application 110 can then proceed to generate (e.g., compile) the web page to generate a modified web page.

As noted above, runtime agent 112 can be used to inject code for context sensitive validation, inject code for implementing a security policy, or a combination thereof for web pages. A service can be provided using the runtime agent 112 to protect the web application 110. The runtime agent 112 can be configured to protect the web application 110 based on context sensitive validation, the security policy, or a combination thereof based on the service to be provided.

In the example of context sensitive validation, the runtime agent 112 determines context sensitive validation for the source code based on an identifier in the source code related to the output. As noted above, a set of possible identifiers for identifying context in a web page 114 can be stored in a data structure associated with the runtime agent 112. The identifiers can include identifiers that open a context and identifiers that close a context. A context is the setting that output of a webpage is in. For example, if a first identifier <html> followed by a second identifier <body> precedes the output and the output is followed by </body> and </html>, the context of the output is HTML text. The runtime agent 112 makes the determination based on a data structure, such as a table indicating a context sensitive validation to implement based on the identifier in the source code. In one example, an identifier, when processed or parsed by the runtime agent 112, can be used to identify the beginning of a context. In some examples, an identifier may include one character or multiple characters. A parser for the programming language used by the web application 110 can be used to determine the context using the identifiers. In this example, another identifier can identify the end of the context. Table 1 includes some examples of validation functions for context sensitive validation to include based on a context of the output. As noted above, the output can be considered content within the context.

TABLE 1

| Context | Validation Function |
| --- | --- |
| HTML Text | Library.checkNoTag(data) |
| HTML Attribute | Library.checkNoQuote(data) |
| HTML Comment | Library.checkNoDashDash(data) |
| HTML Attribute: URL | Library.checkIsURL(data) |
| JavaScript Text | Library.checkAlphaNumeric(data) |
| JavaScript String | Library.checkNoQuote(data) |

For each output located within the respective contexts found within the web page 114, the runtime agent 112 adds a context sensitive validation. In the examples above, the validation function can check to see if content included to provide as output includes a particular feature that is associated with a vulnerability.

In one example, the context of the output is HTML text. In this example, a vulnerability can be that XSS may be injected if an angle bracket is present. Thus, the validation function can check for an "<". If a "<" is present in the output of the web page 114 when executed by the browser, the validation would fail.

In another example, the context of the output is an HTML attribute. The example may include the following code: Name: <input name="name" value="<%=request.get­Parameter("name") %>">. The attribute specifies the value of text for the input element "name." In this example, the output data is inside a HTML attribute (in this example, the value attribute). Here, an XSS attack would need a quote ["] to close a previous start quote. Without the end quote ["], an XSS attack would not be successful. Thus, the validation can check for the quote. As such, validation would not be successful if the output of web page 114 when executed by the browser included a quote.

In a further example, the context of the output is an HTML comment. This example may include the following code: <!-debug: <%=request.getParameter("debug") %>->. Here, the output data is inside the HTML comment and thus would need a "->" to close the previous start comment. Without the "->" an XSS attack would not be successful. Thus, the validation can check for that string or subset of the string (e.g., no dash dash). Thus, if "->" is included in the value that is received at "debug", the validation would fail. An example of a value of "debug" that could be an XSS attack is -><script>alert('hi')</script><!-. This would attempt to close the HTML comment context, which would allow injection of the script including the alert and then restart another HTML comment that gets closed.

In another example, the context of the output is an HTML attribute with a Uniform Resource Locator (URL). The example may include the following code: <a href="<%=request.getParameter("ur") %>">Click here</a>. In this example, the output data is a special case for a HTML attribute. Here a URL inside an <a> tag href attribute does not require a ["] to launch an attack, thus the validation function can check for a JavaScript URL. If a JavaScript URL is present in the output when the web page 114 is executed, the validation would fail.

In a further example, the context of the output is JavaScript Text. The example may include the following code: var x=<%=request.getParameter("value") %>;. In one example, the output is inside of JavaScript text and would just need a ";" to add extra instructions via XSS. Thus a context sensitive validation can be made to ensure that the value is alphanumeric and does not include other characters or symbols. The context sensitive validation can also protect against other similar attacks not using ";" in this example.

In yet another example, the context of the output is a JavaScript String. The example may include the following code: var x='<%=request.getParameter("value") %>';. The output is inside of a JavaScript string, and thus would need an ['] to add instructions via XSS. Thus a context sensitive validation can be included to check to make sure there is not a quote and/or single quote.

These are a sample of context examples. The runtime agent 112 may include other contexts as well. There are various output encoding contexts that can be implemented (e.g., eXtensible Markup Language (XML) context, HTML/XML Tag and Attribute Names, JavaScript inside HTML, Cascading Style Sheets (CSS) inside HTML, URL inside HTML, HTML inside HTML, URL parameter names and values, URL Path and File Name Parts, URL Host Name and Port, URL Protocol, CSS selectors and rules, CSS Identifiers, CSS Property Values, CSS String Literals, URL Inside CSS, etc.). In some examples, the runtime agent 112 can be updated with information about contexts and/or associated validation. With this approach, new contexts and validations can be added to protect the web application 110 without updating the whole web application 110. In some examples, the source code can be processed to determine, based on one identifier or multiple identifiers, the context. A validation function can be mapped to the context and injected as code to protect the output from potential XSS.

The validation function can call an API provided by the runtime agent 112 to send a security alert to the runtime agent 112 upon a validation failure. The API can include code to provide information to the runtime agent 112. Security alerts can be used to call a method performed by the runtime agent 112. The runtime agent can, in response to receiving the security alert, perform a security action associated with the alert, such as log the activity in a log 218, block the output associated with the failed validation function, etc. Further examples of context sensitive validation are provided in the description of FIGS. 7 and 8.

In the example of a security policy, the runtime agent 112 can add a security policy header, as part of the injected code to protect the output, to the modified web page to invoke a browser policy response in a client-side browser 246. In one example, for a context of a static JavaScript block, the runtime agent 112 can calculate a hash which will be included in the security policy header when the web page 114 is served. For a JavaScript block with dynamic content, the runtime agent 112 can add a nonce attribute in the "<script>" tag, the final nonce value can be a random value generated when the web page 114 is served. In certain examples, each HTML event can be rewritten to a "<script>" tag with a nonce value.

In the example of CSP, when the web page 114 is served, the runtime agent 112 can dynamically add the security policy HTTP header with all the calculated hashes for the web page 114. Further, a new random nonce can be generated and be inserted into a corresponding "<script nonce= . . . >" location. HTML events include two parts, an attribute and a script. The attribute describes an action. When the action of the event occurs, the script is run. To rewrite the event, the script is included with an interrupt reflecting the action. Thus, similarly, when the action of the interrupt occurs, the script is run.

Upon a successful XSS, the browser 246 will send a CSP violation report to the web application 110. When processing the web page 114, the browser 246 checks the content of the web page 114 against the header including the calculated hashes and/or nonce values. The browser 246 hashes the same static content (e.g., a static script) and if the value of the browser calculated hash is not equal to the previously calculated hash in the header, a violation occurs. Similarly, when a script is executed by the browser, if the script is checked to determine whether there is a script nonce and whether the script nonce equals one of the script nonce values in the header. The API that receives the violation report at the web application 110 can include a program point that can call the runtime agent to intercept the violation report and can convert the violation report to a runtime event and can provide as a runtime security event. The runtime security event can be converted to be displayed to a user of the device 244a, an administrator, etc. Further, the runtime security event can be sent to a security management platform, which may present the runtime security event in a graph in a dashboard.

There are chances that the runtime agent 112 cannot confirm if the injected code will accidentally block any normal operations, and therefore cause false positives of violations to be reported. A false positive would occur when there is no violation of the security policy, but a violation report is created. To prevent against creating false positives due to inadvertent blocking of normal operations by injected code, the runtime agent 112 will first assume CSP is supported and can issue a "Content-Security-Policy-Report-Only" header to instruct the browser 246 not to block any CSP violation. If the runtime agent 112 does not receive any CSP violation report after a certain number of CSP compliant browsers have been serviced, then the runtime agent 112 can conclude CSP is actually supported on that page. Otherwise, responsive to receiving a violation report, the runtime agent 112 can cause the web application 110 to re-generate or re-compile the web page 114 with CSP disabled (e.g., without the injected code to protect the output) because the reception of the violation report likely indicates inadvertent blocking of normal operations. In some examples, the injected code to protect output that the runtime agent 112 receives CSP violation reports from can be removed, while other injected code to protect other output on the web page can still be implemented. The violation reports can include which injected code was triggered. The injected code reported as triggered can be removed, while others are still included. This is because the reported injected code is likely to be inadvertently blocking normal operations, while there is no evidence that other injected code is blocking normal operations. In other examples, each of the segments of injected code to protect output can be removed to remove any possibility that the runtime agent 112 is inadvertently causing blocking of normal operations.

In some examples, responsive to a HTTP request being sent to the web application 110, the web application 110 will handle the request by processing the corresponding web page. For example, for Java Servlet Page (JSP) technology, the web application 110 would compile the JSP page into a Java source file on the first request, and then compile the Java source file into a Java class. Subsequent requests can then be processed by running the previously compiled Java class directly. This approach can be taken with other technologies being implemented as well (e.g., .NET, APACHE VELOCITY, etc.), where the web page 114 is generated at a first request for the web page and future requests can be serviced by the generated web page.

The communication network 240 can use wired communications, wireless communications, or combinations thereof. Further, the communication network 240 can include multiple sub communication networks such as data networks, wireless networks, telephony networks, etc. Such networks can include, for example, a public data network such as the Internet, local area networks (LANs), wide area networks (WANs), metropolitan area networks (MANs), cable networks, fiber optic networks, combinations thereof, or the like. In certain examples, wireless networks may include cellular networks, satellite communications, wireless LANs, etc. Further, the communication network 240 can be in the form of a direct network link between devices. Various communications structures and infrastructure can be utilized to implement the communication network(s).

By way of example, the devices 244a-244n, computing system 100, etc. communicate with each other and other components with access to the communication network 240 via a communication protocol or multiple protocols. A protocol can be a set of rules that defines how nodes of the communication network 240 interact with other nodes. Further, communications between network nodes can be implemented by exchanging discrete packets of data or sending messages. Packets can include header information associated with a protocol (e.g., information on the location of the network node(s) to contact) as well as payload information.

The engines, modules, and parts described herein can be distributed within an individual device or between more than one devices. The engines e.g., interface engine 216 include hardware and/or combinations of hardware and programming to perform functions provided herein. In some examples, the web application 110 and/or the runtime agent 112 can be implemented as an engine. Moreover, modules can include programming functions and/or combinations of programming functions to be executed by hardware as provided herein. When discussing the engines and modules, it is noted that functionality attributed to an engine can also be attributed to a corresponding module and vice versa. Moreover, functionality attributed to a particular module and/or engine may also be implemented using another module and/or engine. Examples of modules and engines include the runtime agent 112, the interface engine 216, and the web application 110.

A processor, such as a central processing unit (CPU) or a microprocessor suitable for retrieval and execution of instructions and/or electronic circuits can be configured to perform the functionality of any of the engines and/or modules described herein. In certain scenarios, instructions and/or other information, such as rules, can be included in memory (e.g., a computer readable medium). In some examples, input/output interfaces may additionally be provided by the devices. For example, input devices, such as a keyboard, a sensor, a touch interface, a mouse, a microphone, etc. can be utilized to receive input from an environment surrounding the devices. Further, an output device, such as a display, can be utilized to present information to users. Examples of output devices include speakers, display devices, amplifiers, etc. Moreover, in certain examples, some components can be utilized to implement functionality of other components described herein. Input/output devices such as communication devices like network communication devices or wireless devices can also be considered devices capable of using the input/output interfaces.

Figure 3:
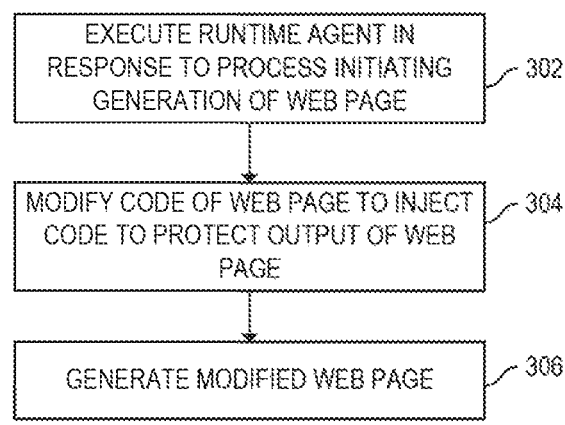
FIG. 3 is a flowchart of a method for modifying code of a web page to include code to protect output, according to an example.
Figure 4:
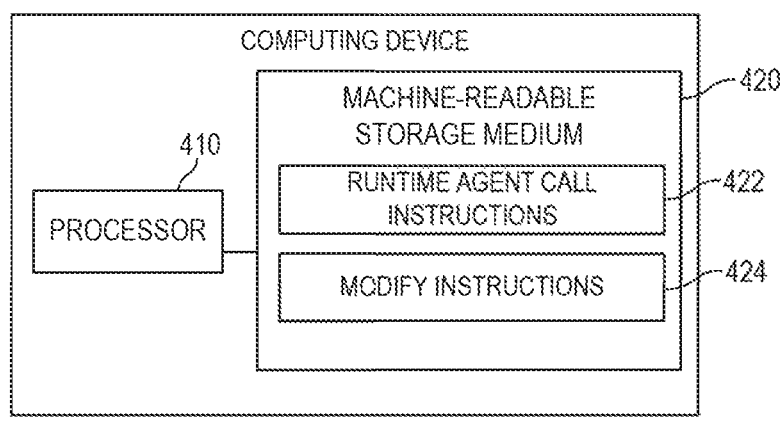
FIG. 4 is a block diagram of a computing device capable of modifying code of a web application to generate a modified web page with injected code to protect output of the modified web page, according to an example.

FIG. 3 is a flowchart of a method for modifying source code of a web page to include injected code to protect output of the web page, according to an example. FIG. 4 is a block diagram of a computing device capable of modifying source code of a web application to generate a modified web page with injected code to protect output of the modified web page, according to an example. Although execution of method 300 is described below with reference to computing device 400, other suitable components for execution of method 300 can be utilized (e.g., computing system 100). Additionally, the components for executing the method 300 may be spread among multiple devices. Method 300 may be implemented in the form of executable instructions stored on a machine-readable storage medium, such as storage media 420, and/or in the form of electronic circuitry.

The computing device 400 includes, for example, a processor 410, and a machine-readable storage media 420 including instructions 422, 424 for calling the runtime agent and protecting the application by modifying a web page before generation. Computing device 400 may be, for example, a desktop computer, a workstation, a server, or any other computing device capable of performing the functionality described herein.

Processor 410 may be, at least one central processing unit (CPU), at least one semiconductor-based microprocessor, at least one graphics processing unit (GPU), other hardware devices suitable for retrieval and execution of instructions stored in machine-readable storage media 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424 to implement method 300. As an alternative or in addition to retrieving and executing instructions, processor 410 may include at least one integrated circuit (IC), other control logic, other electronic circuits, or combinations thereof that include a number of electronic components for performing the functionality of instructions 422, 424.

Machine-readable storage media 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage media 420 may be encoded with a series of executable instructions for protecting a web application. Further, in some examples, the various instructions 422, 424 can be stored on different media.

The computing device 400 can serve a web application to other devices such as clients. These clients can access the web application using a combination of hardware and software such as a web browser or local application.

Runtime agent call instructions 422 can be included in the web application to call the runtime agent to modify source code of a web page. In certain examples, the runtime agent call instructions 422 include code at strategically relevant program points of the web application, for example, at a point of a process initiating generation of a web page from web page code. The strategically relevant program point in this case can be at an API. At 302, responsive to beginning execution of a process initiating generation of the web page of the web application, the runtime agent is executed to modify the web page code. As noted above, the process initiating generation of the web page can include a process to read the web page before compiling, such as the JSPUtil.getReader( ) process in the example of Tomcat JSP noted above. The JSPUtil.getReader( ) process can be considered a part of the web page generation initiation process as being part of the process used to compile or generate the web page. Another part of the compile process can be the actual compiling and/or generation.

At 304, the runtime agent can then process the source code of the web page to modify the source code of the web page to inject code to protect output of the web page. The web page can be generated as a modified web page including the injected code. As noted above, the injected code to protect output can include context sensitive validation, a header to cause enforcement of a web page security policy such as CSP, combinations thereof, etc.

As noted above, in one example, while implementing a web page security policy, adding a header to indicate to a browser to enforce a web page security policy can be implemented by determining and adding a security policy hash to the modified web page before generation to invoke a particular browser policy response. Similarly, a nonce can be added to dynamic content as described above.

Further, an identifier associated with the output can be used to determine a context of the output. The context can be used to determine the injected code to be used and/or placement of the injected code. As noted above, a set of possible identifiers for identifying context in a web page can be stored in a data structure associated with the runtime agent. The identifiers can include identifiers that open a context and identifiers that close a context. A context is the setting that output of a webpage is in. For example, if a first identifier <html> followed by a second identifier <body> precedes the output and the output is followed by </body> and </html>, the context of the output is HTML text. A corresponding context sensitive validation function, in this example Library.checkNoTag(data), can be injected.

When the runtime agent has completed execution to modify the code of the web page, at 306, the process initiating generation of the web page can be executed using the modified code to generate a modified web page. The modified web page can be served to a web browser.

Figure 5:
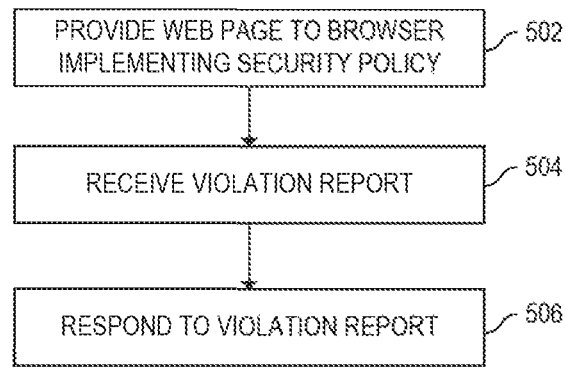
FIG. 5 is a flowchart of a method to provide a modified web page capable of being used by a browser capable of implementing a security policy, according to an example.

FIG. 5 is a flowchart of a method to provide a modified web page capable of being used by a browser capable of implementing a security policy, according to an example. Although execution of method 500 is described below with reference to computing device 400, other suitable components for execution of method 500 can be utilized (e.g., computing system 100). Additionally, the components for executing the method 500 may be spread among multiple devices. Method 500 may be implemented in the form of executable instructions stored on a machine-readable storage medium, such as storage media 420, and/or in the form of electronic circuitry. A runtime agent can be implemented by executing modify instructions 424.

At 502, the computing device 400 provides a modified web page to a browser. In this example, the browser implements a security policy (e.g., CSP). The modified web page can have a security policy header (e.g., as a hash) included as part of injected code to protect output of the modified web page. The header can indicate approved sources of content that browsers should be allowed to load on that page, for example, content that meets a hash included in the header and/or a nonce value included in the header. As noted above, in certain examples, the injected code can include a protection against XSS. The injected code can invoke a browser policy response when a supporting browser executes the web page. When a device asks for the web page, the web page can be provided from a memory (e.g., if the web page was previously generated) or be generated in response to a request from the device's browser.

The browser, when executing the web page, can determine whether content on the web page is approved based on the security policy header. If content in the output of the web page that is does not hash to a value of a hash in the security policy header or a nonce in the security policy header, then a violation has occurred. As such, the browser can limit access to the content that is not approved (e.g., by blocking, warning the user, asking the user to override to see the content, etc.). Further, the browser can provide a violation report back to the web application indicating that the violation occurred. An API can be used to send the report.

At 504, the API can call the runtime agent and the runtime agent can receive the report from the browser. When the browser sends the report to the web application, the runtime agent can execute in response to an API being called when the report is provided (e.g., via a program point at the API) and thus receive the violation report.

At 506, the runtime agent can respond to the violation report. In one example, the violation report can be logged as a security event in response to reception of the violation report. In another example, the security event can be presented (e.g., via a message or email, the log, etc.) to an administrator. Further action can also be taken, for example, blocking access to an address associated with the content causing the violation in other web pages.

As noted above, there am chances that the runtime agent cannot confirm if the transformation approaches will accidentally block any normal operations, and therefore causing false positives. To alleviate this possibility, the runtime agent can first assume the security policy (e.g., CSP) is supported and can issue a request to not enforce the policy, but instead provide a report back (in CSP, by providing a "Content-Security-Policy-Report-Only" header) to instruct the browser not to block any policy violation. If the runtime agent does not receive any policy violation report after a threshold number of policy compliant browsers have been serviced, then the runtime agent can conclude that the policy is actually supported correctly on that page. Then, the "Content-Security-Policy-Report-Only" header can be removed. The higher the threshold number of policy compliant browsers serviced, the more confidence that the security policy is supported. Otherwise, responsive to receiving one of the violation reports, the runtime agent can cause the web application to re-generate or re-compile the web page with the policy (e.g., CSP) disabled. As noted above, segments of the injected code can be removed to guard against inadvertently blocking normal operations.

Figure 6:
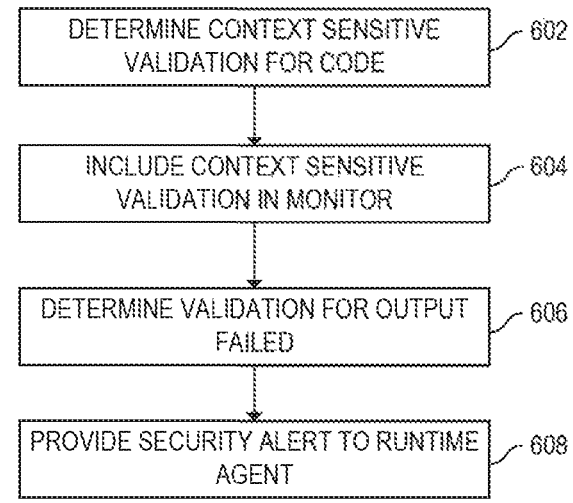
FIG. 6 is a flowchart of a method for modifying code of a web page to include context sensitive validation, according to an example.

FIG. 6 is a flowchart of a method for modifying code of a web page to include context sensitive validation, according to an example. Although execution of method 600 is described below with reference to computing device 400, other suitable components for execution of method 600 can be utilized (e.g., computing system 100). Additionally, the components for executing the method 500 may be spread among multiple devices. Method 600 may be implemented in the form of executable instructions stored on a machine-readable storage medium, such as storage media 420, and/or in the form of electronic circuitry. A runtime agent can be implemented by executing modify instructions 424.

As noted above, when a web page is being generated, the runtime agent can be called to intercept a process to generate the web page. At 602, the runtime agent determines context sensitive validation for the source code of the web page. As noted above, various contexts can be determined based on one identifier or more than one identifiers in the source code. A set of possible identifiers for identifying context in a web page can be stored in a data structure associated with the runtime agent. The identifiers can include identifiers that open a context and identifiers that close a context. A context is the setting that output of a webpage is in. For example, if a first identifier <html> followed by a second identifier <body> precedes the output and the output is followed by </body> and </html>, the context of the output is HTML text. In one example, the context sensitive validation can be determined based on a mapping of the context to the validation as noted above. At 604, the context sensitive validation can be included into the web page source code as injected code to protect output before the web page is generated.

When a browser executes the web page, the context sensitive validation can be executed. If the validation passes, the browser continues to load for the user. If the validation is determined to fail, at 606, the browser can provide the information that the validation failed back to the application via an API. The API can include code to notify the runtime agent of the information at 608. Thus the runtime agent is provided the information that the validation failed as a security alert. The runtime agent can insert the injected code at the API to call the runtime agent when the API receiving the alert is executed. The runtime agent can then log the security event, report the event with a message, etc. Further action can be taken as well, for example, the runtime agent may determine an identifier associated with the content (e.g., IP address) that can be used to blacklist associated content.

FIG. 7 is a diagram representing an unmodified section of code that includes output at a web page, according to an example. FIG. 8 is a diagram of a modified section of the code of FIG. 7 that includes output at a web page, according to an example. FIGS. 7 and 8 are shown using pseudo code to show how code can be injected into a web page to protect output.

The web page code 700 can include starts to scripts identified by <script> 701a, 701b and stops to scripts identified by </script> 703a, 703b. In this example, the script 701a is a static script and script 701b is a dynamic script. Further, the code includes a form identified at 705 and is closed at 707. During processes described herein, the web page code 700 can be converted to web page code 800 to provide added protection to output.

As noted above, compatibility for a browser security policy can be implemented. In web page code 800, a security policy header 801 can be added that includes information about particular content (in this example scripts) that are allowable content. For a static script such as script 803a, a static hash can be calculated 803b and added to the permissible content in the header 801. For dynamic scripts 805a, 805b a nonce can be generated and added. The nonce can be a random value. The nonce can be indicated in the header 801 at 805c. In one example, the form 705 of FIG. 7 can be modified from being written as an event to be rewritten as a script in FIG. 8 to enable enforcement of the security policy. In the example, an action, a submit action on the form, triggers the event to activate. In the script form, an interrupt is used to track the submit action to call the script. In the example shown, the security policy related to CSP.

Additionally or alternatively, context sensitive validation can be injected at 821, 823, 825, 827 of web page code 800. The validation at 821 can be used to ensure that variable "name" is a string due to its context. Further, validation 823 can be used to check that there is no "<" due to the location of the use of "name" in an HTML header. Moreover, validation 825 can check that there is not a quote in "data," which could lead to possible XSS vulnerability. Further, validation 827 can similarly check that there is not a quote in "name", which could lead to possible XSS vulnerability.

What is claimed is:

1. A method comprising:
   responsive to initiation of a compile process for generation of a web page of a web application at a server, executing a runtime agent;
   prior to execution of the compile process, modifying, by the runtime agent, code of the web page to include injected code to protect output of the web page, the injected code including a call to execute a method of the runtime agent and a context sensitive validation function; and
   executing the compile process using the modified code to generate a modified web page.

2. The method of claim 1, wherein the injected code includes a security policy header to invoke a browser policy response.

3. The method of claim 2, further comprising:
   providing the modified web page to a browser,
   wherein the compile process is initiated in response to a request from the browser.

4. The method of claim 3, further comprising:
   receiving a violation report at the runtime agent from the browser; and
   responsive to receiving the violation report, logging the violation report as a security event.

5. The method of claim 4, further comprising:
   providing another header to the browser, the another header to set the browser to report, but not enforce, a browser policy as part of the browser policy response; and
   recompiling the web page to generate a dynamically generated web page without the injected code in response to the violation report.

6. The method of claim 1, further comprising:
   determining, by the runtime agent, a context sensitive validation for the code using the context sensitive validation function.

7. The method of claim 6, further comprising:
   executing the context sensitive validation function during execution of the modified web page; and
   providing the runtime agent an alert of a validation failure in response to a determination that the validation failure has occurred.

8. A computing system comprising:
   a physical processor implementing machine readable instructions that cause the computing system to:
   serve a web application;
   responsive to initiation of a compile process to generate a web page of the web application, execute a runtime agent;
   prior to execution of the compile process, modify, by the runtime agent, code of the web page to include injected code to protect output of the web page, the injected code including a call to execute a method of the runtime agent, wherein the injected code includes a context sensitive validation function; and compile the modified code to generate a modified compiled web page.

9. The computing system of claim 8, wherein the physical processor implements machine readable instructions that cause the computing system to:
provide the modified compiled web page to a browser, wherein the injected code includes a security policy header to invoke a browser policy response;
receive a violation report as part of the browser policy response at the runtime agent; and
responsive to receiving the violation report, log the violation report as a security event.

10. The computing system of claim 9, wherein the physical processor implements machine readable instructions that cause the computing system to:
provide a second header to the browser, the second header indicating to the browser to report, but not enforce, a browser policy as part of the browser policy response; and
responsive to receiving the violation report, recompile the code of the web page to generate another web page without the injected code.

11. The computing system of claim 8, wherein the physical processor implements machine readable instructions that cause the computing system to:
determine, using the context sensitive validation function, a context sensitive validation for the code based on an identifier in the code related to the output; and
include the context sensitive validation in the injected code.

12. The computing system of claim 11, wherein the physical processor implements machine readable instructions that cause the computing system to:
determine that a validation failure occurred for the output during execution of the modified compiled web page; and
provide a security alert to the runtime agent indicating the validation failure.

13. A non-transitory machine-readable storage medium storing instructions that, if executed by at least one processor of a device, cause the device to:
responsive to initiation of a compile process to generate a web page of a served web application, execute a runtime agent; and
prior to execution of the compile process, modify, by the runtime agent, code of the web page to include injected code to protect output of the web page based on an identifier associated with the output, the injected code including a call to execute a method of the runtime agent,
wherein the injected code includes a context sensitive validation function,
wherein when the web page is compiled, a modified compiled web page that includes the modified code is generated.

14. The non-transitory machine-readable storage medium of claim 13, further comprising instructions that, if executed by the at least one processor, cause the device to:
receive a violation report from a browser at the runtime agent in response to provisioning by the served web application of the modified compiled web page to the browser; and
log the violation report.

15. The non-transitory machine-readable storage medium of claim 13, further comprising instructions that, if executed by the at least one processor, cause the device to:
determine the context sensitive validation function for the code based on the identifier;
determine that a validation for the output failed; and
provide a security alert to the runtime agent describing a failure of the validation.

16. The non-transitory machine-readable storage medium of claim 13, wherein the injected code includes a security policy header to invoke a policy response of a browser displaying the modified compiled web page.

17. The non-transitory machine-readable storage medium of claim 16, wherein the security policy header includes a hash value calculated by the runtime agent.

18. The non-transitory machine-readable storage medium of claim 13, wherein the call is to execute the method of the runtime agent to record a security event.

19. The method of claim 1, wherein the call is to execute the method of the runtime agent to record a security event.

20. The computing system of claim 8, wherein the call is to execute the method of the runtime agent to record a security event.

\* \* \* \* \*